Jan. 1, 1957 F. S. KRAG 2,775,787
APPARATUS FOR THE MANUFACTURE OF HARDBOARD
Filed May 24, 1951 4 Sheets-Sheet 1

INVENTOR.
FREDERIC S. KRAG
BY Hudson, Boughton,
Williams, David & Hoffmann
ATTORNEYS

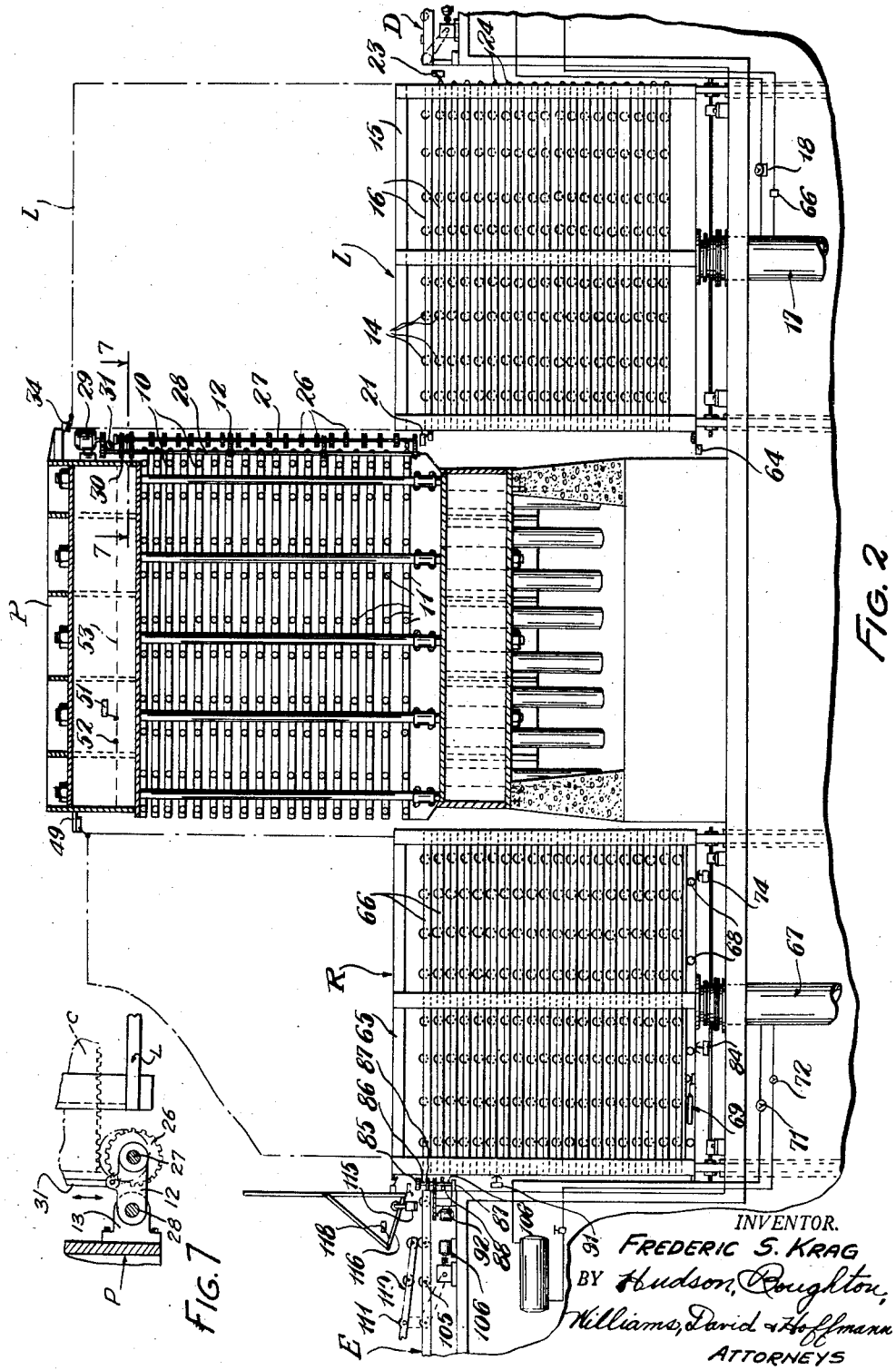

Jan. 1, 1957 F. S. KRAG 2,775,787
APPARATUS FOR THE MANUFACTURE OF HARDBOARD
Filed May 24, 1951 4 Sheets-Sheet 3

INVENTOR.
FREDERIC S. KRAG
BY Hudson, Boughton,
Williams, David & Hoffmann
ATTORNEYS

United States Patent Office 2,775,787
Patented Jan. 1, 1957

2,775,787

APPARATUS FOR THE MANUFACTURE OF HARDBOARD

Frederic S. Krag, New York, N. Y., assignor to The Coe Manufacturing Company, Painesville, Ohio, a corporation of Ohio Application May 24, 1951, Serial No. 228,061

3 Claims. (Cl. 18—4)

The present invention relates to apparatus for manufacturing sheet-like material, and more particularly, to apparatus for manufacturing so-called, matboard, pressed board and/or hardboard, and the like.

Certain sheet-like material, such as that known as matboard, hardboard, wallboard, and the like, is prepared of a suitable composition including a binder which may be natural or synthetic thermosetting resins, and at one stage of manufacture, it is in wet, soft and crumbly sheet form which is then pressed and heated usually between flat plates to produce a dry, hard sheet. Pressing mechanisms are provided for this purpose and they normally have heated platens or plates between which the sheets are heated and pressed, and it is necessary that the platens be perfectly smooth and clean to produce a correspondingly smooth surface on the sheets.

Considerable difficulty has been experienced in efficiently loading and unloading these presses and in maintaining the platen surfaces even and clean to provide matboards having a smooth finished surface. In multiple platen presses, i. e., presses having tiered platens, the space between the platens is relatively small, and access thereto for inserting the sheets, cleaning the platens of accumulation of matter, and removing sticking sheets, etc., is difficult and time consuming. In the event the platens become dented it is necessary to resurface or replace them, which is difficult as the platens are quite heavy, and the presses must be out of operation during the replacement.

Various attempts have been made to overcome the difficulties mentioned and to increase the efficiency of the pressing operations; however, these attempts have not been entirely satisfactory.

The principal object of the present invention is the provision of new and improved apparatus for pressing sheet material of the character mentioned, which apparatus comprises a press mechanism adapted to heat and press sheet material, particularly hardboard, carried by removable plates referred to as "caul plates" or "cauls," means for automatically moving the cauls into and out of the press, and conveying mechanism which circulates the cauls from the discharge side of the press to the loading side thereof, and which apparatus makes provision for removing pressed sheets from the cauls and loading unpressed sheets thereon in their travel from the discharge side to the loading side of the press, the conveying mechanism being so arranged that the cauls may be inspected, cleaned or replaced, if necessary, during the travel from the unloading to the loading side of the press.

Another object of the invention is the provision of a new and improved apparatus of the character referred to in the preceding paragraph having means for placing caul plates on the tops of unpressed sheets about to enter the press.

A further object of the invention is the provision of a new and improved sheet pressing apparatus of the character referred to having a conveying mechanism for transferring upper caul plates removed from the pressed sheets to the tops of unpressed sheets about to enter the press on lower caul plates, the conveying mechanism for the upper caul plates having provision for inspecting, cleaning or replacing the caul plates being transferred thereby to the sheet tops.

A still further object of the invention is the provision of a new and improved apparatus for manufacturing hardboard and the like, having press loading mechanism for simultaneous transferring sheet material positioned between caul plates into one side of the press and out of the opposite side after the pressing operation so that the press may be loaded and unloaded substantially simultaneously.

Another object of the invention is the provision of a new and improved apparatus of the type referred to having means for automatically controlling the movements of the caul plates throughout the sheet pressing operation, including positioning the caul plates for receiving the unpressed sheets therebetween.

The invention resides in certain constructions, combinations and arrangements of parts, and further objects and advantages will be apparent to those skilled in the art to which it relates from the following description of the preferred embodiment described with reference to the accompanying drawings, wherein:

Fig. 2 is a diagrammatic side view of a pressing and heating mechanism, including loading and unloading elevators therefor, forming a part of the apparatus shown in Fig. 1;

Fig. 7 is an enlarged detailed sectional view showing the manner in which the pinions engage the caul racks on the loading elevator, the section being taken on a plane indicated by line 7—7 of Fig. 2.

Figure 1:
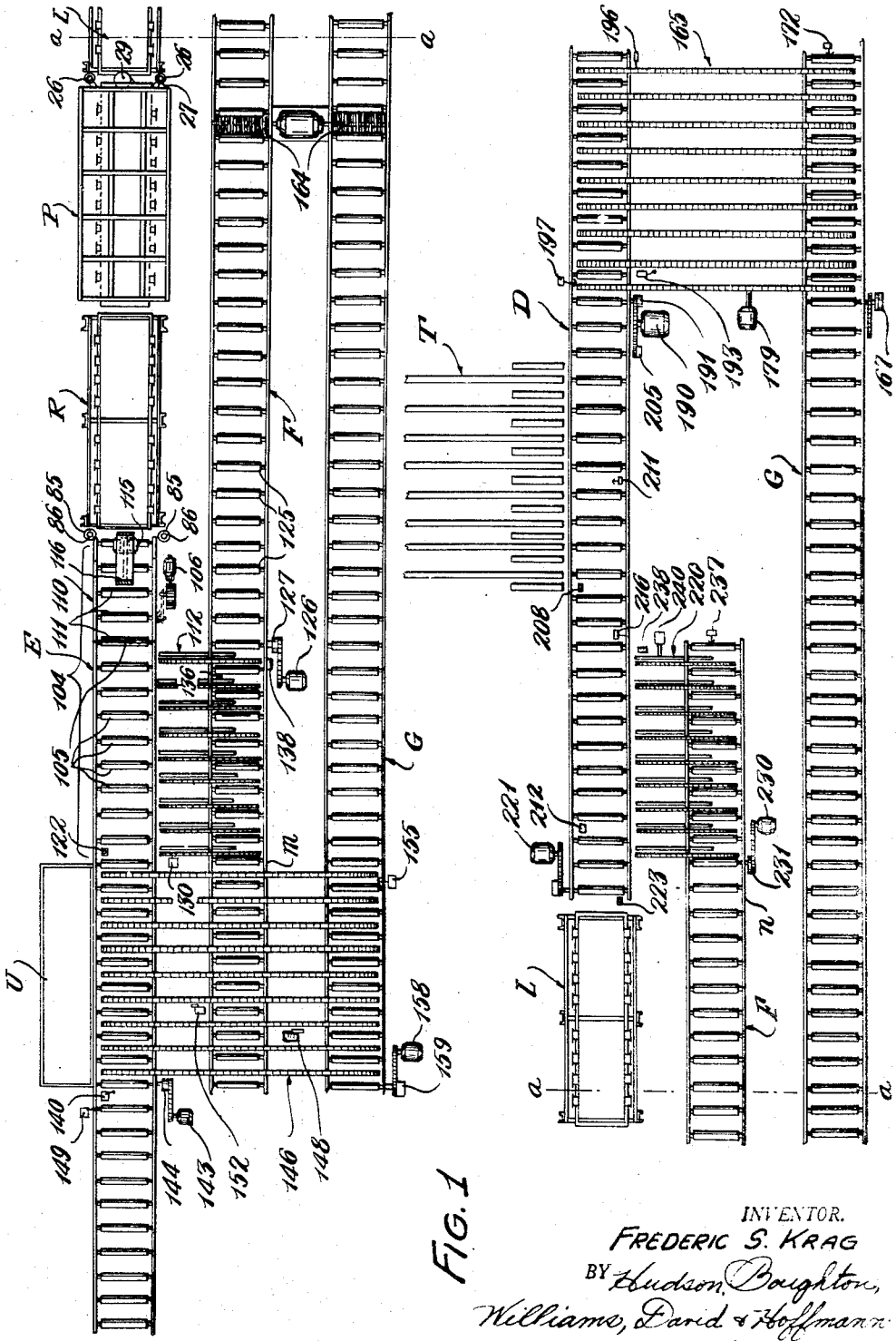
Fig. 1 is a diagrammatic plan view of apparatus for manufacturing hardboard in accordance with the present invention, the apparatus being shown in two parts which are separated along line a—a.
Figures 3, 4, 6:
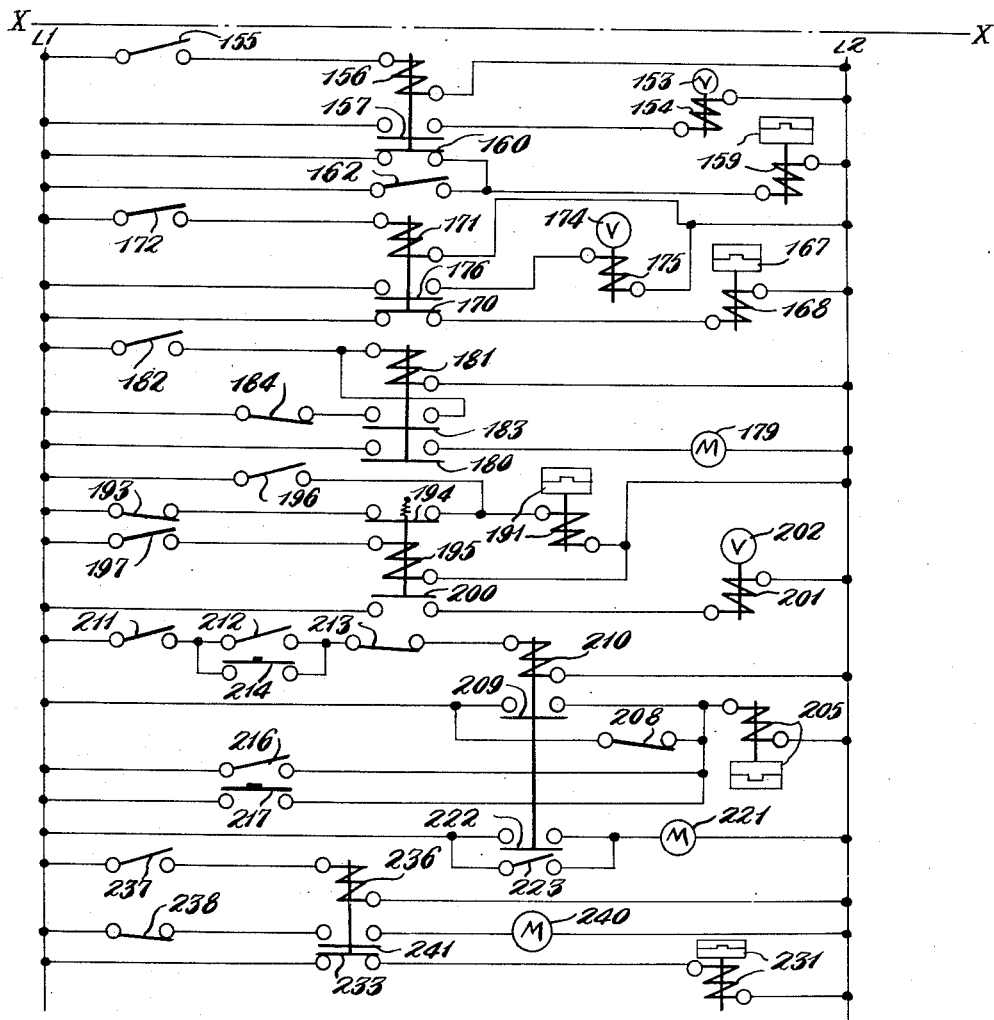
Fig. 3 is a fragmentary plan view of two caul plates having an unpressed sheet of hardboard therebetween.
Fig. 4 is a sectional view taken along line 4—4 of Fig. 3, but on a larger scale.
Figs. 5 and 6 show the wiring diagram of the control system for the apparatus, the diagram being shown in two sections divided along line x—x
Figure 5:
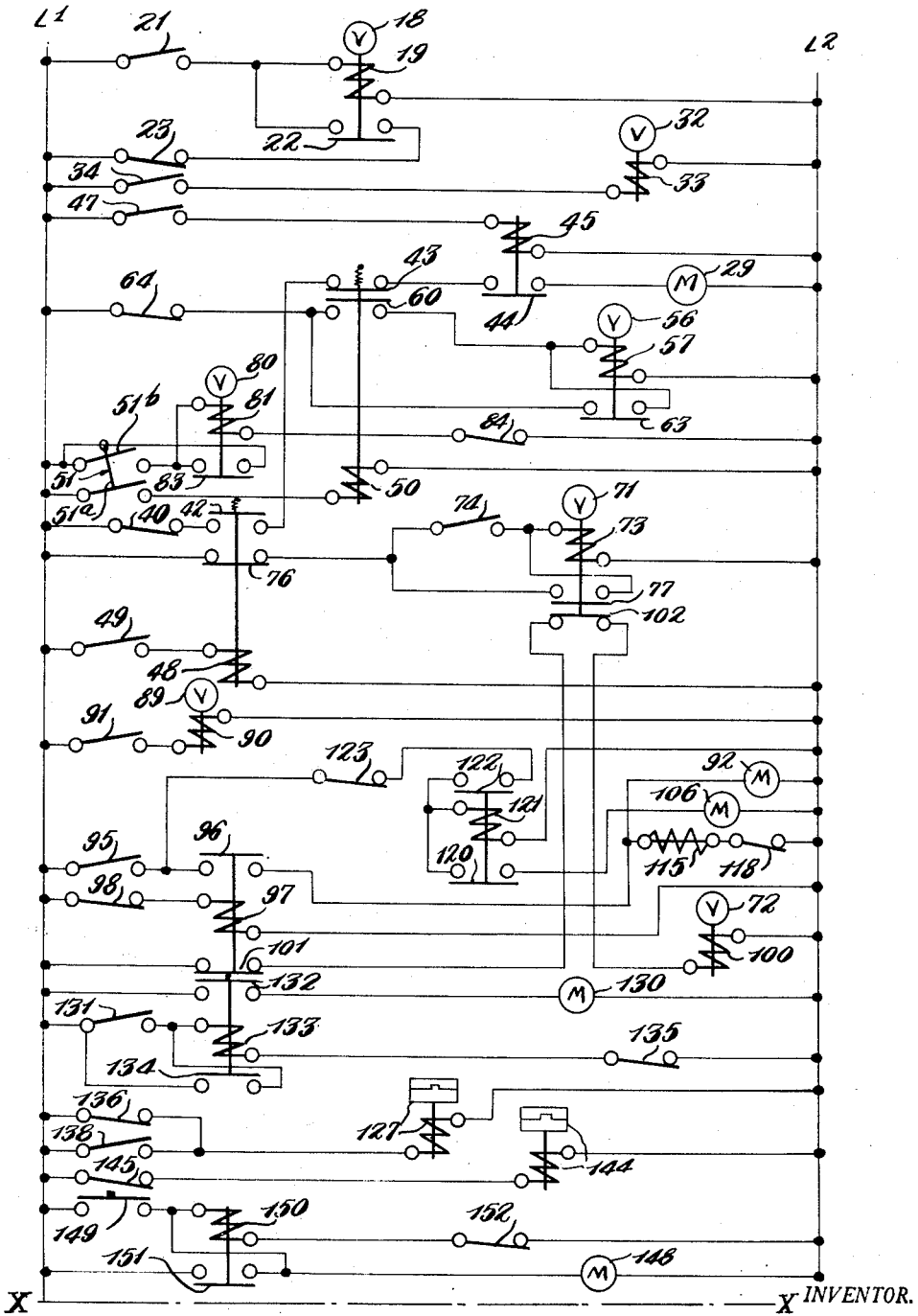

In general, the invention contemplates the provision of a deck press preferably having a plurality of decks adapted to apply heat and pressure to a plurality of sheets positioned therebetween, which sheets are carried between upper and lower caul plates. The lower caul plates, which support the sheet material, are moved from the discharge side of the press to the loading side of the press by a conveying mechanism in such a manner that they can be conveniently unloaded of pressed sheets and loaded with unpressed sheet-by-sheet handling equipment at stations outside the press proper. In the preferred form of the invention caul plates are placed on the tops of the unpressed sheets resting on the lower or bottom caul plates as the loaded lower caul plates approach the press, and during the pressing operation are engaged by the under sides of the press platens. In addition, the conveying mechanism transfers the upper or top caul plates removed from the pressed sheets to a station for deposition onto unpressed sheets about to enter the press. The top and bottom caul plates carried by the conveying mechanism may be inspected, polished, or replaced, during the transfer of the caul plates from the sheet unloading station to the sheet loading station. The apparatus includes a control system which is substantially completely automatic in moving the caul plates through the apparatus.

The invention is susceptible of use in apparatus for pressing and/or heating various types of sheet materials, but it is particularly suitable for the manufacture of hardboard and it is herein shown embodied in such an apparatus. The apparatus includes a press, indicated generally at P, having a plurality of decks formed by flat platens 10 between which top and bottom caul plates C, C' having an unpressed sheet of hardboard material B therebetween are adapted to be received. The press is capable of pressing a number of sheets simultaneously, and in the embodiment shown, the press has a capacity of seventeen sheets; however, it could be one having any desired capacity. The platens 10 are heated by suitable means, not shown, to polymerize the resins in the sheet material and are yieldingly supported in spaced relation to receive cauls therebetween and to be moved toward one another to press the material therebetween by pressure applying mechanism not shown as it may be of conventional design. The lower and upper caul plates C', C between which the hardboard B is carried when it is inserted between the press platens are preferably of relatively thin polished stainless steel and provide smooth material engaging surfaces. The platens 10 have a series of rollers 11 at the sides thereof on which the lower platens roll to enter and leave the press. The rollers 11 are yieldingly supported by springs, not shown, to enable the platens to press the caul plates and the hardboard therebetween.

The decks of the press P are simultaneously loaded with caul plates having sheet material therebetween from a loading elevator L and at the same time caul plates on the decks are unloaded into a receiving elevator R located at opposite ends of the press and which elevators have a plurality of caul supporting decks adapted to be aligned with the press decks.

The elevator L comprises a frame 15 having the same number of decks formed by conveyor sections 16 as there are openings between the press platens 10, and spaced in correspondence with the spacing of the press platens when the latter are open. The conveyor sections 16 include freely running rollers 14 to receive caul plates moved thereon by an intermittently operated power conveyor D, described more fully hereinafter. The pairs of caul plates having unpressed hardboard therebetween are brought to the loading elevator one at a time by the conveyor D and the elevator decks are loaded in succession beginning with the top deck. Intermediate each caul feeding operation of the conveyor D, the frame 15 is automatically elevated by a pneumatic cylinder and piston lift mechanism indicated at 17 in steps each corresponding to the spacing of the conveyor sections or decks 16, to bring the successive elevator decks into registration with the discharge of the conveyor.

The elevator raising movement of the lift mechanism 17 is controlled by a valve 18 opened by energization of a solenoid 19, the circuit of which includes suitable power lines L1, L2, and which is controlled by a normally open switch 21, fixedly located relative to the elevator adjacent to the discharge end thereof and adapted to be closed by the leading ends of caul plates rolled into place on the respective conveyor sections 16 from the conveyor D. The solenoid 19 is maintained energized after switch 21 reopens and until the elevator raises the distance between adjacent decks 16, by a holding circuit established around the switch, which circuit includes a normally open contactor 22, which is closed by the solenoid 19, and a normally closed switch 23. The switch 23 is fixed relative to the elevator and is momentarily opened by lugs 24, located on the elevator in spaced relation corresponding to the vertical spacing between the elevator decks or sections 16, to deenergize the solenoid 19 when the elevator has been raised to bring the next lower deck into alignment with the discharge of conveyor D. This circuit arrangement causes the valve 18 to be automatically operated intermittently as the cauls are fed to the elevator to raise the elevator in steps corresponding to the spacing of the decks thereof until the elevator is completely loaded and in its uppermost position as shown in dotted lines in Fig. 2. At this time the deck or conveyor sections 16 of the loading elevator L are in registration with the respective decks of the press formed by the platens 10.

The pairs of caul plates C, C' with a sheet of unpressed hardboard therebetween may be moved out of the press loading elevator L and into the press in any suitable manner. As shown, the bottom caul plates C have gear racks 25 along the opposite sides for engagement by power driven pinions 26 carried by two vertical shafts 27 located at opposite sides of the entrance end of the press, which pinions mesh with the gear racks and move the cauls from the elevator into the press when the pinions are rotated. The shafts 27 are journalled in the ends of arms 12 journalled on shafts 28 supported on the press by brackets 13, and the shafts are driven by a motor 29 through suitable gearing, including gears 30 rotatably journalled on the stems 28 so that the motor is drivingly connected with the pinions throughout the swinging movement of the pinions.

The pinions 26 are swung to and from their caul rack engaging positions by a pneumatically operated piston 31 which is controlled by a valve 32 actuated by a solenoid 33. The valve 32 is in a pipe line connected with a suitable source of air pressure, not shown, and the piston 31 is controlled so that it moves the pinions to their caul gear rack engaging positions only after the elevator L reaches its uppermost position, and to this end the solenoid 33 is energized by the closure of a normally open switch 34 which is closed by the elevator L as it moves into its upper position in which the conveyor decks 16 are aligned with the press platens 10.

The motor 29 for driving the caul moving pinions 26 is energized after the pinions are moved into mesh with the caul gear racks 25 and the press has completed its board curing cycle, and the circuit for the motor is completed through a switch 40, which is closed when the press completes its curing cycle, contactors 42, 43 and 44 which are in series. Contactor 42 is normally open and is closed by a relay solenoid 48 when the latter is energized by closure of a switch 49 which is closed by the elevator R as it moves into its uppermost position, as indicated in broken lines in Fig. 2. Contactor 43 is normally closed and is opened by energization of a relay solenoid 50. Contactor 44 is normally open and is closed by energization of a relay solenoid 45, and the circuit of which is completed by closure of a switch 47 located to be engaged and closed by the piston 31 reaching the end of its stroke in moving the pinions to engage the cauls.

When the cauls from elevator L are moved into place on the press decks by motor 29, the circuit for the motor is broken by opening of contactor 43 effected by energization of the relay solenoid 50, the circuit of which is closed by a normally open contact 51a of a double contact switch 51 which contact is adapted to be closed momentarily by a lug 52 on a chain 53 driven by the drive for the caul moving pinions 26. The chain 53 coacts after the motor 29 is deenergized and the switch 51 reopens and deenergizes the solenoid 50. By this control arrangement, motor 29 is started only when both elevators L and R are in their uppermost positions and the pinions 26 are engaged with the racks 25 on the cauls in the elevator L, and is automatically stopped after the cauls from the loading elevator have been moved into the press. As the cauls from elevator L move into the press, the cauls having pressed and cured hardboards therebetween are pushed by the incoming cauls from the platens and into the conveyor decks of elevator R, described more fully hereinafter.

After the cauls have been transferred to the press as described, the elevator L is lowered by actuation of exhaust valve 56 by the energization of a solenoid 57, the circuit of which is closed by a normally open contactor 60 which is closed by the energization of the solenoid 50, described previously. The solenoid 57 is maintained energized after switch 51 reopens through a holding contactor 63 connected in parallel with contactor 60, and is deenergized by opening of a normally closed switch 64 which is located to be opened when the elevator L reaches its lowermost position. By this arrangement, it will be seen that after the cauls have been removed from the elevator L and positioned in the press, the elevator is automatically returned to its lowermost position where it may then automatically reload from conveyor D, as described, while the hardboards in the press are cured. It will be noted that as the elevator L begins its descent switch 34 is reopened and solenoid 33 is deenergized which actuates valve 32 to cause the piston 31 to swing the pinion shafts 27 from the positions in which the pinions engage the caul gear racks. Preferably, contactor 43 is delayed in reclosing after solenoid 50 is deenergized as by a dashpot, not shown, until after contactor 44 opens upon opening of switch 47 and the deenergization of solenoid 45.

The construction of the receiving elevator R is in general similar to that of the loading elevator L, having a frame 65 provided with decks of freely running roller type conveyor sections 66 which correspond in number and spacing with the press platens 10 and which frame is carried by an elevator cylinder and piston 67 similar to that of the cylinder and piston 17. One structural feature which elevator R possesses over elevator L is that the frame 65 is movable to and from the press P on rollers 68, which movement is effected by a pneumatically actuated piston 69.

The elevating piston 67 is controlled by valves 71, 72 to raise and lower the elevator R. The valve 71 is actuated by energization of a solenoid 73 to cause the elevator to be raised to its uppermost position, indicated by dotted lines in Fig. 2, in which the conveyor sections 66 register with the respective platens 10 to receive cauls having pressed, cured hardboards therebetween as explained previously. Solenoid 73 is energized by closure of a normally open switch 74 which is closed by the elevator R when it is in its lowermost position. The circuit for solenoid 73 includes a normally closed contactor 76 in series with switch 74, and a holding contactor 77 which is closed by solenoid 73 to form a holding circuit around switch 74 and maintain the valve 71 open until the elevator R reaches its uppermost position, at which time switch 49 is closed to energize solenoid 48 which opens contactor 76 to break the circuit of solenoid 73 and close the valve 71. The elevator R is held in its upper position until exhaust valve 72 is opened, as explained hereinafter.

The pneumatic piston 69 for shifting the frame of elevator R is controlled by a valve 80 which is actuated by a solenoid 81 and which is arranged to control the piston to move the rack toward the press when the solenoid is deenergized and to move the rack from the press and to the left to bring the ends of the cauls therein into alignment with a caul extracting or unloading mechanism described hereinafter when the solenoid is energized. The solenoid 81 is energized by the closure of contact 51a of switch 51 by the chain lug 52 when the cauls are moved from the press and into place on the elevator R, whereby the piston 69 moves the elevator rack to the left and into alignment with the caul extracting mechanism. The circuit for solenoid 81 is maintained energized, after contact 51b reopens, through a holding circuit established through a contactor 83 closed by the solenoid, and which solenoid circuit includes a normally closed switch 84 which is opened when the elevator R reaches its lowermost position to break the solenoid circuit and cause the piston 69 to move the elevator rack toward the press, in which position it is maintained until the switch 51 is again momentarily closed, as described hereinbefore.

The mechanism for extracting the cauls from elevator R includes two motor driven pinions 85 adapted to mesh with the gear racks 25 on the lower caul plates and are located at the entrance of a table type power operated conveyor E on opposite sides thereof. The pinions 85 are attached to vertical shafts 86 arranged to swing on pivoted arms 87 to move the pinions into and out of engagement with the gear racks 25 of the lower caul plates in each conveyor section 66 aligned with the entrance to conveyor E. The arms 87 are swung by a pneumatically operated piston 88 suitably connected therewith and the operation of the piston is controlled by a valve 89 which is actuated by a solenoid 90. The circuit for the solenoid 90 is completed through a switch 91 which is normally open and is closed by the frame 65 of elevator R when it is moved to its left hand position by the piston 69.

The shafts 86 and pinions 85 are driven by an electric motor 92 through a suitable drive mechanism, and the motor is energized when the pinions 85 are positioned to engage the gear racks of the cauls, and to this end the motor circuit is controlled by a normally open switch 95, closed by the movement of shafts 86 to engage the pinions with the caul racks, and a normally closed contactor 96 which is opened by a solenoid 97 when the latter is energized. Solenoid 97 is energized through a normally closed switch 98 which is fixed relative to the elevator frame 65 and is opened by the lower cauls C in the elevator decks 66 as they are brought into alignment with the conveyor E. As the cauls are removed from the conveyor sections 66, switch 98 is released and recloses to energize solenoid 97 which opens contactor 96 to break the circuit of motor 92 until the contactor 96 is reclosed by deenergization of the solenoid when the switch 98 is reopened by the next caul lowered into alignment with the conveyor E. By this arrangement motor 92 is automatically controlled to be idle during the time succeeding cauls are lowered into position to be extracted from the elevator and is energized as long as is required to extract the respective sets of cauls.

The elevator R is lowered in steps to bring succeeding sets of cauls into alignment with conveyor E by the operation of exhaust valve 72, which is actuated by solenoid 100 to cause lowering of the elevator when the solenoid is energized. The circuit for solenoid 100 is controlled by a contactor 101 which is closed by energization of solenoid 97, the latter being energized each time a set of cauls is removed from engagement with switch 98 and onto the conveyor E as explained prevously, and contactor 102 when solenoid 73 is deenergized. Thus, solenoid 100 is energized to cause the elevator R to be lowered in steps corresponding to the vertical spacing between the conveyor sections 66 so that the cauls on these sections may be successively transferred to the conveyor E. When the elevator reaches its lowermost position it closes switch 74 to energize solenoid 73 and actuate valve 71 to cause the elevator to be moved to its upper position, as described previously. The circuit for solenoid 100, which operates valve 72 is deenergized by the opening of contactor 102. The lowermost position of the elevator is not reached until after the last set of cauls has been removed from the elevator.

The conveyor E is a roller table type and includes a section 104 having rollers 105 which are driven in unison by a motor 106 through a chain and sprocket drive which includes overrunning clutches. The conveyor E also includes an inclined section 110 which is supported above section 104 and which has rollers 111 driven by the motor 106 in unison with rollers 105 through a suitable drive, and this section carries the upper or top caul plates C to a transfer mechanism 112. In order to remove the top caul plate from the pressed hardboards as they emerge from the receiving elevator R between top and bottom caul plates, an electromagnet 115 is suspended from a carrier which rides on an inclined track 116 suitable supported above the conveyor 110 and the lower end of which positions the magnet immediately above the caul plates as they emerge from the elevator. The magnet 115 is automatically energized to raise the leading ends of the top caul plates and carry them upwardly over the inclined conveyor section 110 and deposit them on the driven conveyor rollers 111. The electromagnet 115 is connected in parallel circuit with the motor 92, and the parallel circuit includes a normally closed switch 118 which is arranged to be opened by the magnet as it reaches the outer end of the track 116 and cause the magnet to release the caul plate held thereby. By this arrangement, the top caul plates pass inwardly on the rollers of the conveyor section 110 and the lower caul plates are moved along the conveyor section 104 by the rollers 105.

The circuit for motor 106 for driving the rollers 105 and 111 is controlled by a normally open relay contactor 120 which is closed by relay solenoid 121 when the latter is energized. The circuit for the solenoid 121 includes switch 95, which is closed when pinions 85 are swung to engage the caul gear racks in elevator R, and contactor 96, and a holding circuit is completed around contactor 96 through a contactor 122 closed by solenoid 121 and a normally closed switch 123. The circuit for solenoid 121 is broken to stop motor 106 by opening of the switch 123 which is located on section 110 of conveyor E slightly more than a caul length from the entrance to the conveyor, and is opened when a caul plate is moved thereagainst. This action stops the conveyor rollers of sections 104 and 110 with the top cauls at the receiving station of the transfer mechanism 112.

The transfer mechanism 112 is adapted to transfer the top caul plates from the conveyor E to a conveyor F which extends parallel to the elevators L, R and press P. The left hand end of the conveyor F, as seen in the drawings, terminates beyond the transfer mechanism 112 and the opposite end terminates slightly more than a caul length beyond the entrance end of elevator L and alongside conveyor D. In the form shown, the conveyor F is a table type having rollers 125, and the rollers between points m, n are driven by a constantly energized electric motor 126 through a magnetic and overrunning clutch 127 to move cauls toward the right hand end of the conveyor.

The transfer mechanism 112 may be of any suitable design by which the caul plates are overturned as they are transferred to the conveyor F, and the mechanism is driven by an electric motor 130. As the top caul plates move along the conveyor 110 and come into registration with the pickup side of transfer mechanism 112 they engage and close a switch 131 which energizes the circuit of motor 130 to actuate the transfer mechanism, causing the caul plate to be overturned and deposited onto the conveyor F. The motor 130 is operated to cause the transfer mechanism to operate through a cycle after which the motor is deenergized, and its circuit includes a relay contactor 132 which is adapted to be closed by a solenoid 133 which is energized when switch 131 is closed. A holding circuit for the solenoid 133 is established around switch 131 through a contactor 134 closed by the solenoid. The solenoid circuit includes a normally closed switch 135 which is momentarily opened to deenergize the circuit for the transfer mechanism motor by a timing chain on the mechanism.

As each top caul begins to move over conveyor F on the transfer mechanism 112 it engages a normally closed switch 136 which is in the circuit of the magnetic clutch 127 and the clutch is deenergized to stop the rollers 125 beneath the discharge of the transfer mechanism. As the caul is deposited onto the conveyor E a normally open limit switch 138 in parallel with switch 136, is closed to reenergize the magnetic clutch which drives the rollers for moving the caul along the conveyor.

During the transfer of the top caul plates from conveyor E to conveyor F, the undersides thereof are exposed for inspection, and if it appears that any of the surfaces are damaged, the plate can be withdrawn from the left hand end of the conveyor F and a new caul substituted therefor.

Referring again to the conveyor E and the course of the lower caul plates, an unloading rack U is located adjacent thereto, and the rollers opposite the rack are driven by a motor 143 through a magnetic clutch 144, the circuit of which is controlled by a switch 145 which is arranged to be engaged and opened by a caul plate moved into position opposite the unloading rack, to deenergize the clutch 144 and stop the conveyor. The pressed hardboard may then be removed from the caul and placed on the rack U by workmen. If the hardboard adheres to the caul plate, for any reason, the plate and board may be moved onto the left hand end of the conveyor E and the board separated from the caul by special handling.

The emptied lower caul plates are next transferred to a conveyor G, which extends parallel to conveyor F and is spaced slightly more than three caul plate widths from conveyor E, by a power driven transfer mechanism 146. The mechanism 146 may be of any suitable type by which the cauls are transferred, preferably without overturning, and in the present instance it comprises chain type conveyors on arms which are adapted to be raised and lowered at opposite ends between the rollers of the conveyors E, G, to lift and deposit the cauls from the conveyors, respectively. The transfer mechanism 146 is powered by an electric motor 148, the circuit of which may be completed through a manual switch 149 actuated by an operator when the hardboard has been removed from the caul to be transferred. The closure of switch 149 energizes the motor 148 and a relay solenoid 150 which establishes a holding circuit about switch 149 through a contactor 151, and the holding circuit also includes a switch 152 which is adapted to be momentarily opened by a timing chain after a caul plate has been moved approximately one-third of the travel of the transfer mechanism, which breaks the circuit of solenoid 150 and causes contactor 151 to drop out and deenergize the motor.

The discharge end of the transfer mechanism 146 is raised and lowered by a pneumatically operated piston to deposit the cauls onto the conveyor G. The piston is controlled by a valve 153 which is actuated by a solenoid 154 to cause the discharge end to be lowered when the solenoid is energized. As the caul plates on the transfer 146 are moved directly over the conveyor G and before the transfer arms lower the cauls onto the conveyor, the cauls close a switch 155 which energizes a solenoid 156. Solenoid 156 closes a contactor 157 which energizes solenoid 154 to open valve 153 to actuate the piston and cause the transfer device to lower the caul plate onto the conveyor.

The rollers of conveyor G in the section directly beneath the discharge of the transfer mechanism 146 are driven by a motor 158 through a magnetic clutch 159 which is engaged when energized by a circuit through a normally closed contactor 160. Contactor 160 is opened by energization of solenoid 156 so that the rollers under the transfer discharge are stopped as the cauls are lowered thereon. As the caul plate is lowered onto the now stationary rollers of conveyor G, a normally open switch 162 in parallel circuit with contactor 160 is closed by the lowered transfer arms and the clutch 159 is energized and the conveyor rollers are driven to move the caul plate toward the right hand end of the conveyor. As the board travels along the conveyor switch 155 is released, thereby deenergizing the valve solenoid 154 to cause the discharge arms of the transfer mechanism to be elevated. The magnetic clutch 159 is maintained energized through the reclosed contactor 160.

The cauls travelling along conveyor G, pass beneath a rotary brush 164 which cleans and polishes the upturned surface thereof and move to the entrance of a transfer mechanism 165, which mechanism is similar to the transfer mechanism 146. The rollers of the conveyor G opposite the entrance to the transfer mechanism 165 are driven through a magnetic clutch 167 which is engaged when the solenoid 168 is energized. The solenoid 168 is energized through a normally closed contactor 170 which is opened by a relay solenoid 171 which is energized by closure of a normally open switch 172. Switch 172 is closed by the caul plates as they move into position at the entrance to the transfer 165.

The lifting arms of the transfer mechanism 165 at the entrance thereto are pneumatically operated and are controlled by a valve 174 which is actuated by a solenoid 175 to cause the arms to raise when the solenoid is energized and to be lowered when the solenoid is deenergized. The circuit of solenoid 175 is controlled by a normally open contactor 176 which is closed by solenoid 171 when the latter is energized.

The transfer mechanism 165 includes chains which carry the caul plates, and the chains are driven by an electric motor 179 the circuit of which is controlled by a contactor 180 which is closed by a relay solenoid 181 when the solenoid is energized. The solenoid 181 is energized through a switch 182 which is closed when the arms of the transfer mechanism 165 are raised to lift the caul plates from the conveyor G, and a holding circuit is established around switch 182 through a contactor 183 closed by the solenoid. The holding circuit includes a normally closed switch 184 which is momentarily opened by a timing chain on the transfer mechanism after the caul plate elevated from the conveyor has moved slightly more than its width toward conveyor D.

The rollers in the section of conveyor D opposite the discharge of the transfer mechanism 165 are driven by an electric motor 190 through a magnetic clutch 191. The circuit for clutch 191 includes a normally closed switch 193, a normally closed contactor 194, which is opened by energization of a solenoid 195, and a normally open switch 196 which is in parallel with switch 193 and contactor 194. The circuit for solenoid 195 is controlled by a normally open switch 197. As the respective caul plates moving on the transfer mechanism 165 approach the conveyor D, switch 193 is opened thereby and the circuit for the magnetic clutch 191 is deenergized which stops the rollers in the section of the conveyor opposite the discharge of the transfer. When the caul plate is moved directly over the conveyor D, the switch 197 is engaged and closed by the caul plate, which energizes the relay solenoid 195 which in turn opens contactor 194 and closes a contactor 200. The discharge arms of the transfer 165 are raised and lowered by a pneumatic piston controlled by a valve 202, which valve is actuated by a solenoid 201 and is moved to cause lowering of the arms to deposit the cauls on the conveyor when the solenoid is energized. As the discharge arms of the transfer 165 move to their lowered portion, switch 196 is closed thereby which reenergizes clutch 191 and the conveyor rollers move the caul to the left. Switch 197 is released and opens, as the caul moves out of alignment with the discharge side of the transfer 165, to deenergize solenoid 195 to cause reopening of the circuit for the valve solenoid 201 at contactor 200, thereby causing the discharge arms of the transfer to be raised.

The caul plates deposited onto the conveyor D from the transfer 165 are adapted to receive thereon an unpressed hardboard from a tipple unloader T. The conveyor rollers opposite the unloader T are driven by the motor 190 through a magnetic clutch 205 which is engaged when it is energized. The circuit for clutch 205 includes a normally closed switch 208 and a normally open contactor 209 which is in parallel with the switch 208. The contactor 209 is closed by a relay solenoid 210, the circuit of which includes normally open switches 211, 212, in series with a normally closed switch 213, and a normally open manual switch 214 in parallel with switch 212. As the caul plate moves opposite the unloader T, the plate engages and opens switch 208 which deenergizes the clutch and disengages the drive for the rollers on which the caul plate rests. An unpressed hardboard is then deposited on the caul plate and as it is moved into place on the caul it closes switch 211. Switch 212 is adapted to be closed by a top caul in place on the top of the hardboard of the preceding loaded caul plate. In initiating operation of the system, the switch 214 is closed manually to form a shunt circuit about switch 212, since there will be no preceding top caul plate to close the same. Switch 213 is arranged to open only in response to movement of the elevator L from its raised to its lowermost position; otherwise the switch is closed and a circuit is thereby normally established through relay solenoid 210 when an unpressed board is loaded onto a caul plate. Solenoid 210 closes contactor 209 which reestablishes the circuit for the clutch 205 and the conveyor rollers are driven to move the loaded caul to the left. A normally open switch 216 is connected in parallel circuit with contactor 209 and switch 208 and is arranged to be closed by the caul plate as it commences to move to the left, thereby maintaining the clutch 205 engaged, although switches 211, 212 reopen, until the caul passes 216, at which time the switch reopens and deenergizes the clutch.

The clutch 205 can be selectively engaged by closing a manually operated switch 217 which is in parallel with switch 216.

The section of conveyor D to the left of the unloader T is opposite the discharge of a transfer mechanism 220 which is similar to the transfer mechanism 112 and is adapted to remove top caul plates from conveyor F and deposit them on the unpressed hardboards carried by the lower caul plates on conveyor D. The rollers of conveyor D opposite the discharge of the transfer mechanism 220 are driven by an electric motor 221, the circuit of which is controlled by a contactor 222 and a normally open switch 223 which are in parallel circuit. The contactor 222 is closed by energization of relay solenoid 210, and switch 223 is located to be engaged and closed by the caul plates as they move along conveyor D just before entering the elevator L. Switch 223 thus maintains the circuit for motor 221 until the cauls leave conveyor D and enter the elevator L.

Referring again to the top caul plates which are deposited onto the conveyor F, the cauls are moved to the right toward the transfer mechanism 220 and pass beneath the rotary cleaning and polishing brush mechanism 164, similarly to the bottom cauls moving along conveyor G.

The right hand end of the conveyor F terminates opposite the entrance to the transfer mechanism 220 and the conveyor rollers in this section are driven by a motor 230 through a magnetic clutch 231. The clutch 231 is engaged when it is energized, and the circuit therefor includes a normally closed contactor 233 which is opened by energization of a relay solenoid 236. The circuit for solenoid 236 is adapted to be energized by closure of a normally open switch 237 and to be maintained by a holding circuit including a normally closed switch 238 and a normally open contactor 241. The transfer mechanism 220 is driven by an electric motor 240, the circuit of which is controlled by the contactor 241 which is closed by the energization of solenoid 236. The motor circuit also includes the switch 238. Switch 237 is located to be engaged and closed by a caul plate as the latter reaches the right hand end of conveyor F which results in the energization of relay solenoid 236 which breaks the circuit to the clutch solenoid 231 at contactor 233 and energizes the motor 240 through switch 238 and contactor 241. The transfer mechanism 220 is then operated to raise the caul plate from conveyor F and invert and deposit it on the top of a hardboard on a caul on conveyor D. The switch 238 is momentarily opened by a timing chain after the caul is deposited to break the circuit through solenoid 236 which opens motor contactor 241 and recloses the clutch solenoid contactor 233.

It will be apparent that the objects enumerated, as well as others, have been achieved and that the invention provides apparatus which facilitates the curing and finishing of hardboard and like sheet material so that the finishing process in the manufacture of such material can be greatly accelerated and handled with a minimum of labor.

While the preferred form of the invention has been described in considerable detail, it will be apparent that the invention is not limited to the constructions shown and it is my intention to cover hereby all adaptations, modifications and changes therein which come within the practice of those skilled in the art to which the invention relates and the scope of the appended claims.

Having thus described my invention, I claim:

1. In an apparatus for processing sheet material positioned between upper and lower caul plates carrying a rack, a press having a plurality of platens arranged in decks to receive upper and lower caul plates therebetween, first and second elevators at opposite sides of said press each including vertically movable frames having decks comprising conveyor sections for said caul plates and adapted to register with the decks of platens of said press respectively, power means operated in response to the movement of caul plates onto the decks of said first elevator to move said first elevator vertically step by step to bring successive decks thereof into registration with said table type conveyor for loading said decks thereof and to move the decks thereof into registration with the decks of said press, power means including a pinion pivotally mounted on said press for engaging the rack carried by the caul plates while on said first elevator, power means on said press for moving said pinion into and out of engagement with said rack, a control device responsive to said second elevator being positioned in registration with the decks of said press to simultaneously move caul plates from said first elevator into said press and caul plates in said press onto the decks of said second elevator, a table type conveyor arranged to receive caul plates from successive decks of said second elevator as the latter is moved vertically in steps, means to move said second elevator vertically in steps to register successive decks thereof with said table type conveyor, the last mentioned means including a control device responsive to the movement of caul plates from said second elevator onto said conveyor, power actuated means including a pinion engageable with the rack carried by the caul plates for moving the caul plates from said second elevator to said conveyor, said conveyor comprising upper and lower sections, and means to elevate the upper of said caul plates onto the upper of said conveyor sections.

2. In an apparatus for processing sheet material positioned between upper and lower caul plates carrying a rack, a press having a plurality of platens arranged in decks to receive upper and lower caul plates therebetween, first and second elevators at opposite sides of said press each including vertically movable frames having decks comprising conveyor sections for said caul plates adapted to register with the decks of platens of said press when said elevators are in upper positions, power means operated in response to the movement of caul plates onto the decks of said first elevator to move said first elevator upwardly from a lower position to said upper position step by step, power means including a pinion pivotally mounted on said press for engaging the rack carried by the caul plates while on said first elevator, power means on said press for moving said pinion into and out of engagement with said rack, a control device responsive to said first and second elevators being positioned in their upper position in registration with the decks of said press to simultaneously move caul plates from said first elevator into said press and caul plates in said press onto the decks of said second elevator, a table type conveyor arranged to receive caul plates from successive decks of said second elevator as the latter is moved from said upper position downwardly, power means to move said second elevator vertically in steps to register successive decks thereof with said table type conveyor, the last said means including a control device responsive to the movement of caul plates from said second elevator onto said conveyor, said conveyor comprising upper and lower sections, and means to elevate the upper of said caul plates onto the upper of said conveyor sections as the caul plates are carried thereunder by the lower section.

3. In an apparatus for processing sheet material positioned between upper and lower caul plates, power driven conveying mechanism for transferring the upper and lower caul plates including two conveyor sections one above the other, the lower conveyor section adapted to move the lower of the caul plates therealong, means to raise the upper caul plate carried by the lower caul plate onto the upper of said conveyor sections comprising an electromagnet, means to guide said magnet in an upwardly extending path to raise caul plates to said upper conveyor, and means responsive to movement of said magnet to a predetermined position to control energization thereof.

References Cited in the file of this patent

UNITED STATES PATENTS

| | | |
|---|---|---|
| 1,563,037 | Mead | Nov. 24, 1925 |
| 1,706,874 | De Journo | Mar. 26, 1929 |
| 1,903,102 | Farley | Mar. 28, 1933 |
| 1,905,929 | Matthias | Apr. 25, 1933 |
| 2,027,165 | Grubman | Jan. 7, 1936 |
| 2,046,446 | Carlisle | July 7, 1936 |
| 2,264,125 | Wolf et al. | Nov. 25, 1941 |
| 2,420,813 | Camerota | May 20, 1947 |
| 2,449,136 | Pattison | Sept. 14, 1948 |
| 2,510,573 | Gray | June 6, 1950 |
| 2,599,693 | Chapman | June 10, 1952 |
| 2,612,275 | Chapman | Sept. 30, 1952 |
| 2,614,590 | Hervey | Oct. 21, 1952 |

FOREIGN PATENTS

| | | |
|---|---|---|
| 433,778 | Great Britain | Aug. 15, 1935 |